US011974606B2

(12) United States Patent
Desnerck et al.

(10) Patent No.: US 11,974,606 B2
(45) Date of Patent: May 7, 2024

(54) COATED HEATING ELEMENT FOR AN AEROSOL-GENERATING DEVICE

(71) Applicant: Philip Morris Products S.A., Neuchatel (CH)

(72) Inventors: Simon Desnerck, Kortrijk (BE); Louis-Philippe Vancraeynest, Kortrijk (BE); Pieter Van Lancker, Kortrijk (BE)

(73) Assignee: Philip Morris Products S.A., Neuchatel (CH)

( * ) Notice: Subject to any disclaimer, the term of this patent is extended or adjusted under 35 U.S.C. 154(b) by 532 days.

(21) Appl. No.: 17/294,043

(22) PCT Filed: Nov. 13, 2019

(86) PCT No.: PCT/EP2019/081213
§ 371 (c)(1),
(2) Date: May 14, 2021

(87) PCT Pub. No.: WO2020/099504
PCT Pub. Date: May 22, 2020

(65) Prior Publication Data

US 2022/0007723 A1 Jan. 13, 2022

(30) Foreign Application Priority Data

Nov. 15, 2018 (EP) .................................... 18206565

(51) Int. Cl.
*A24F 40/46* (2020.01)
*H05B 3/14* (2006.01)

(52) U.S. Cl.
CPC ............. *A24F 40/46* (2020.01); *H05B 3/145* (2013.01)

(58) Field of Classification Search
CPC ................................ H05B 3/145; A24F 40/46
(Continued)

(56) References Cited

U.S. PATENT DOCUMENTS 5,369,723 A 11/1994 Counts et al.
5,591,368 A 1/1997 Fleischhauer et al.
(Continued)

FOREIGN PATENT DOCUMENTS

CN 204048037 U 12/2014
CN 108185537 A 6/2018
(Continued)

OTHER PUBLICATIONS

Combine Russian Federation Office Action and Search Report dated Dec. 6, 2021 in Russian Federation Patent Application No. 2021113669/03(028935) (with English translation), 18 pages.
(Continued)

*Primary Examiner* — Gary F Paumen
(74) *Attorney, Agent, or Firm* — Oblon, McClelland, Maier & Neustadt, L.L.P.

(57) ABSTRACT

A heating element for an aerosol-generating device is provided, the heating element including a heat-generating portion and a carbon-containing layer in thermal contact with the heat-generating portion, the carbon-containing layer including graphene; and a non-heat-generating portion, a layer of graphene being configured to transfer generated heat from the heat-generating portion to the non-heat-generating portion of the heating element. An aerosol-generating device for generating an inhalable aerosol is also provided, the device including the heating element.

15 Claims, 3 Drawing Sheets

(58) Field of Classification Search
USPC .......................................................... 131/329
See application file for complete search history.

(56) References Cited

U.S. PATENT DOCUMENTS

| | | | | |
|---|---|---|---|---|
| 2015/0007837 A1* | 1/2015 | Roudier | A24D 1/22 428/218 |
| 2015/0163859 A1* | 6/2015 | Schneider | A24F 40/46 219/535 |
| 2017/0055576 A1 | 3/2017 | Beeson et al. | |
| 2017/0164659 A1* | 6/2017 | Schneider | A24F 40/46 |
| 2017/0303586 A1 | 10/2017 | Sur | |
| 2018/0338539 A1 | 11/2018 | Sur | |

FOREIGN PATENT DOCUMENTS

| | | | |
|---|---|---|---|
| GB | 2551250 | A | 12/2017 |
| KR | 10-2018-0044407 | A | 5/2018 |
| KR | 10-2018-0064469 | A | 6/2018 |
| RU | 2 644 314 | C2 | 2/2018 |
| RU | 2 664 815 | C1 | 8/2018 |
| WO | WO 2013/124357 | A1 | 8/2013 |
| WO | WO 2014/102092 | A1 | 7/2014 |
| WO | WO 2016/070068 | A1 | 5/2016 |

OTHER PUBLICATIONS

International Search Report and Written Opinion dated Jan. 17, 2020 in PCT/EP2019/081213 filed Nov. 13, 2019

Korean Notice of Allowance dated May 4, 2023 in Korean Application 10-2021-7013663, (with English translation), 4 pages.

Chinese Office Action mailed on Nov. 18, 2023 issued in Chinese Patent Application No. 201980067419.X filed on Nov. 13, 2019, with English Translation, total 13 pages (citing documents 1, 15-16, therein).

* cited by examiner

COATED HEATING ELEMENT FOR AN AEROSOL-GENERATING DEVICE

The invention relates to a coated heating element for an aerosol-generating device, an aerosol-generating device comprising a coated heating element and a method of manufacturing such aerosol-generating device. Aerosol-generating devices are known which heat but do not burn aerosol-generating substrates such as tobacco. These devices heat aerosol-generating substrates to a sufficiently high temperature to create an aerosol for inhalation by a user.

These aerosol-generating devices typically comprise a heating chamber, wherein a heating element is arranged within the heating chamber or surrounding the heating chamber. An aerosol-generating article comprising an aerosol-forming substrate can be inserted into the heating chamber and heated by the heating element. The heating element may be configured as a heating blade which penetrates into the aerosol-forming substrate of the aerosol-generating article when the article is inserted into the heating chamber. It is desirable to configure the heating elements such that they heat up homogenously and reach the operating temperature as fast as possible.

Upon penetration into, and retraction out of the aerosol-forming article the surfaces of the heating elements are subject to friction forces due to contact with the aerosol-forming article. Thus it is desirable to improve resilience of the surface of the heating elements.

Accordingly, it is an object of the present invention to provide a heating element that allows for uniform heating of the aerosol-forming substrate. It is a further object of the invention to provide a heating element with increased lifetime.

For solving this and further objects, the present invention proposes a heating element for an aerosol-generating device. The heating element comprises a heat-generating portion and a carbon-containing layer. The carbon containing layer is in thermal contact with the heat-generating portion.

By providing the heating element with a carbon-containing layer, the thermal energy created by the heat-generating portion may be evenly distributed over the surface of the heating element. The more even heat distribution also has the effect that the heating may be more energy efficient, since the heat-generating portion may be operated at a slightly lower temperature.

The provision of the carbon-containing layer may advantageously improve one or more mechanical properties of the heating element compared to a heating element without a carbon-containing layer. The one or more mechanical properties may include, but are not limited to the strength, toughness, hardness, durability, and wear resistance of the heating element. For example, the overall strength of the heating element may be increased.

The carbon-containing layer of the heating element may comprise a layer of graphene. As used herein, the term "graphene" refers to a planar crystalline allotrope of carbon wherein the carbon atoms are packed densely in a regular hexagonal lattice. The graphene may have the thickness of only a single carbon atom, this may be referred to as "mono-layer graphene". The graphene may have the thickness of only a few carbon atoms, this may be referred to as "multi-layer graphene". For example, where the graphene is multi-layer graphene, it may have a thickness of no more than 50 carbon atoms, no more than 20 carbon atoms, or no more than 10 carbon atoms. As used herein, the term "graphene" includes pristine graphene, graphene with defects, impurities or inclusions, reduced graphene oxide, and combinations thereof. Graphene is known to possess remarkable 2-dimensional properties. In particular graphene has very high thermal and electric conductivity along the plane defined by the layer of graphene. Accordingly by providing a layer of graphene thermal energy is distributed fast and evenly over those parts of the heating element that are provided with the graphene layer. The graphene layer may be provided at the surface of the heating element. In this way not only even heat distribution of the heating element is achieved, but also the mechanical properties, such as durability of the surface of the heating element may be increased.

The carbon-containing layer may be provided in the form of a coating, preferably in the form of a graphene coating. The coating may be formed by Atmospheric Pressure Chemical Vapor Deposition (APCVD), vacuum evaporation, sputtering, conventional CVD, plasma CVD, or flame pyrolysis. Alternatively, the material may be applied using other coating methods known to the skilled person.

The carbon-containing layer may comprise one or more graphene sheets. Graphene sheets may be produced using various mechanical production techniques, such as exfoliation techniques, cleaving or reduction of graphite oxide monolayer films.

The carbon-containing layer may comprise a plurality of graphene sheets with additional carbon-containing structures between the graphene sheets. For example, the carbon-containing layer may comprise at least two graphene sheets and with the additional carbon-containing structures provided between the at least two graphene sheets. The additional carbon structures between the graphene sheets may be single-walled carbon nanotubes, multi-walled carbon nanotubes, fullerenes such as Buckminsterfullerenes, combinations and parts thereof or other carbon based structures. The additional carbon structures are provided in order to enhance thermal conductivity in a direction perpendicular to the plane of the graphene sheet. Where the additional carbon-containing structures are carbon nanotubes, the longitudinal axis of the carbon nanotubes may be arranged substantially perpendicular to the plane of the adjacent graphene sheets. This may further enhance thermal conductivity in a direction perpendicular to the plane of the graphene sheet due to the high axial thermal conductivity of carbon nanotubes.

The additional carbon-containing structures may be chemically bonded to the adjacent graphene sheets. For example, carbon atoms of the additional carbon-containing structures may be covalently bonded to carbon atoms of the graphene sheets. This may advantageously increase thermal conductivity between the additional carbon-containing structures and the graphene sheets.

The additional carbon-containing structures between the graphene sheets may be arranged in a regular pattern between the graphene sheets. In this way the additional carbon structures may provide improved mechanical support for spacing the graphene sheets from each other. At the same time the regularly arranged additional carbon structures may also increase homogeneity of the heat transfer in the direction perpendicular to the plane of the graphene sheets.

The heating element may be an electrically heated heating element. The heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and superalloys based on nickel, iron, cobalt, stainless steel, Timetal® and iron-manganese-aluminium based alloys.

As described, in any of the aspects of the disclosure, the heating element may be part of an aerosol-generating device. The aerosol-generating device may comprise an internal heating element or an external heating element, or both internal and external heating elements, where "internal" and "external" refer to the location of the heater relative to an aerosol-forming substrate, when the heater is used to heat the aerosol-forming substrate. An internal heating element may take any suitable form. For example, an internal heating element may take the form of a heating blade. Alternatively, the internal heater may take the form of a casing or substrate having different electro-conductive portions, or an electrically resistive metallic tube. Alternatively, the internal heating element may be one or more heating needles, pins, or rods that run through the center of the aerosol-forming substrate in use. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

The internal heating element may have a tapered, pointed or sharpened end to facilitate insertion of the heating element into the aerosol-forming substrate of the aerosol-generating article.

An external heating element may take any suitable form. For example, an external heating element may take the form of one or more flexible heating foils on a dielectric substrate, such as polyimide. The flexible heating foils can be shaped to conform to the perimeter of the substrate receiving cavity. Alternatively, an external heating element may take the form of a metallic grid or grids, a flexible printed circuit board, a molded interconnect device (MID), ceramic heater, flexible carbon fibre heater or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation.

The internal or external heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. In one embodiment, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy. The heat sink or heat reservoir may be arranged such that it is directly in contact with the aerosol-forming substrate and can transfer the stored heat directly to the substrate. Alternatively, the heat stored in the heat sink or heat reservoir may be transferred to the aerosol-forming substrate by means of a heat conductor, such as a metallic tube.

The heating element advantageously heats the aerosol-forming substrate by means of conduction. The heating element may be at least partially in contact with the substrate, or the carrier on which the substrate is deposited. Alternatively, the heat from either an internal or external heating element may be conducted to the substrate by means of a heat conductive element.

During operation, the aerosol-forming substrate may be completely contained within the aerosol-generating device. In that case, a user may puff on a mouthpiece of the aerosol-generating device. Alternatively, during operation an aerosol-generating article containing the aerosol-forming substrate may be partially contained within the aerosol-generating device. In that case, the user may puff directly on the aerosol-generating article.

The heating element may comprise a layer of electrically insulating material. The electrically insulating material may be arranged between the heat-generating portion and the carbon-containing layer of the heating element. By providing an electrically insulating material between the heat-generating portion and the carbon-containing layer the carbon-containing layer is electrically decoupled from the electric circuit of the heating element. This is particularly important if the carbon-containing layer comprises graphene. Graphene has a high electrical conductivity and may act as a secondary route for electric current, hampering resistive heating of the heat-generating portion. The electrically insulating material preferably has a high thermal conductivity to facilitate heat transfer from the heat-generating portion to the carbon-containing layer of the heating element.

At least a part of the carbon-containing layer is preferably arranged on the layer of electrically insulating material of the heating element. In this way the carbon-containing layer is provided in close vicinity to and in thermal contact with the heat-generating portion of the heating element. By providing the carbon-containing layer in thermal contact with the heat-generating portion but electrically insulated from the heat-generating portion, the high thermal conductivity of the carbon-containing layer can be efficiently used for distributing the generated thermal energy fast and homogenously over the heating element.

The heating element may further comprise a non-heat-generating portion. The non-heat-generating portion may be arranged adjacent to the heat-generating portion of the heating element. The carbon-containing layer may be configured to transfer the generated heat from the heat-generating portion to the non-heat-generating portion of the heating element. In this way the thermal energy generated by the heat-generating portion may be evenly distributed over the entire heating element. The non-heat-generating portion may be made from any suitable material.

The carbon-containing layer may be designed to a have a predetermined spatial arrangement. In this way the heat conduction properties of the carbon-containing layer may be specifically designed to provide a heating element that in use shows a predetermined temperature distribution.

According to a further aspect the invention relates to an aerosol-generating device for generating an inhalable aerosol. The aerosol-generating device comprises a heating chamber configured to receive an aerosol-generating article containing aerosol-forming substrate. The aerosol-generating device further comprises a heating element as described above.

The aerosol-generating device may further comprise a housing, an electrical power supply connected to the heating element and a control element configured to control the supply of power from the power supply to the heating element.

The housing may define a cavity surrounding or in vicinity of the heating element. The cavity may be configured to receive the aerosol-generating article. The cavity may form or comprise the heating chamber of the aerosol-generating device.

Preferably, the aerosol-generating device is a portable or handheld aerosol-generating device that is comfortable for a user to hold between the fingers of a single hand.

The aerosol-generating device may be substantially cylindrical in shape.

The aerosol-generating device may have a length of between approximately 70 mm and approximately 120 mm.

The heating element may be an internal heating element that is arranged within the heating chamber of the aerosol-generating device. The heating element may be arranged centrally in and aligned along the longitudinal axis of the heating chamber.

The heating element may be an external heating element that is arranged adjacent to the sidewalls of the heating chamber, or at least in part forms part of the sidewalls of the heating chamber. The heating element may be configured such that the carbon-containing layer of the heating element extends at least partly over the inner sidewall of the heating chamber of the aerosol-generating device.

The aerosol-generating article to be received in the aerosol-generating device may be substantially cylindrical in shape. The aerosol-generating article may be substantially elongate. The aerosol-generating article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-generating article may have a total length of approximately 45 mm. The aerosol-generating article may have an external diameter of approximately 7.2 mm. Further, the aerosol-forming substrate may have a length of approximately 10 mm. Alternatively, the aerosol-forming substrate may have a length of approximately 12 mm. Further, the diameter of the aerosol-forming substrate may be between approximately 5 mm and approximately 12 mm. The aerosol-generating article may comprise an outer paper wrapper. Further, the aerosol-generating article may comprise a separation between the aerosol-forming substrate and the filter plug. The separation may be approximately 18 mm, but may be in the range of approximately 5 mm to approximately 25 mm.

The aerosol-forming substrate is a substrate capable of releasing volatile compounds that can form an aerosol. The volatile compounds may be released by heating the aerosol-forming substrate. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material.

The aerosol-forming substrate preferably comprises: homogenised tobacco material between about 55 percent and about 75 percent by weight; aerosol-former between about 15 percent and about 25 percent by weight; and water between about 10 percent and about 20 percent by weight.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The aerosol-former may be propylene glycol. The aerosol former may comprise both glycerine and propylene glycol.

The aerosol-generating device may further comprise a control element, a power supply and contacts. The contacts electrically contact the heat-generating portion of the heating element. The control element is configured to control the supply of power from the power supply to the heat-generating portion via the contacts.

The power supply may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The controller element may be a simple switch. Alternatively the control element may be electric circuitry and may comprise one or more microprocessors or microcontrollers.

In another aspect of the invention, there is provided an aerosol-generating system comprising an aerosol-generating device according to the description above and one or more aerosol-generating articles configured to be received in the cavity of the aerosol-generating device.

In a further aspect of the invention there is provided a method of manufacturing a heating element for an aerosol-generating device. The method comprises the steps of providing a heat-generating portion and arranging a carbon-containing layer onto and in thermal contact with the heat-generating portion to obtain a heating element of the present invention.

The carbon-containing layer that is arranged onto the heat-generating portion may comprise a layer of graphene. The carbon-containing layer may be a graphene-containing layer. The method step of arranging the layer of graphene may include depositing the layer of graphene in the form of a graphene coating to the heat generating portion. The layer of graphene may also comprise sheets of graphene that are mechanically arranged onto the heat generating portion of the heating element.

The method of manufacturing a heating element for an aerosol-generating device may comprise the steps of providing a heating element comprising a heat-generating portion and a non-heat-generating portion, and arranging a graphene-containing layer onto and in thermal contact with both the heat-generating portion and the non-heat-generating portion.

Features described in relation to one aspect or embodiment may also be applicable to other aspects and embodiments of the invention.

The invention will be further described, by way of example only, with reference to the accompanying drawings in which.

Figure 1:
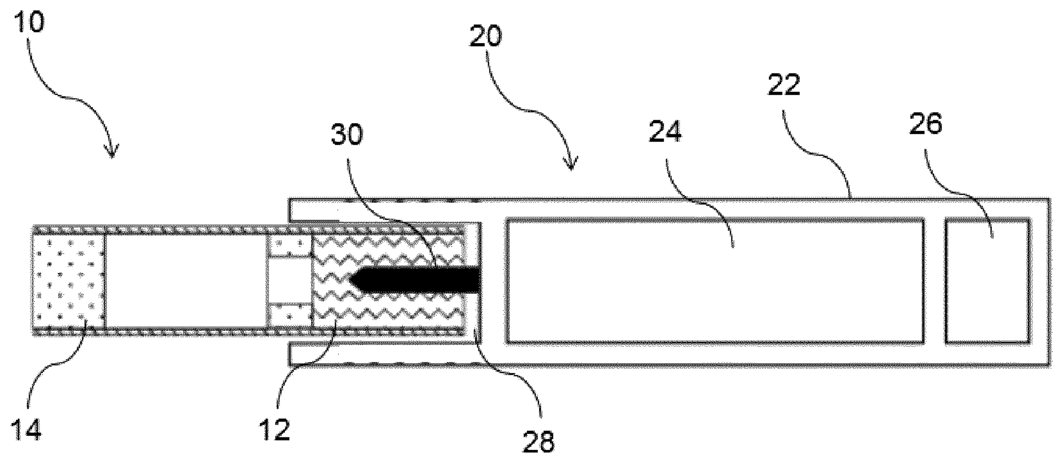
FIG. 1 shows an aerosol-generating device according to the present invention.

FIG. 1 shows a cross-sectional view of an aerosol-generating system comprising an aerosol-generating article 10 and an aerosol-generating device 20. At one end of the aerosol-generating article 10 an aerosol-forming substrate 12 is provided. At the second end of the aerosol-generating article 10 a filter element 14 is provided.

The aerosol-generating device 20 comprises a housing 22 in which a power source 24 and a controller circuitry 26 are arranged. At one end of the housing a cavity 28 is formed that is configured to receive the aerosol-generating article 10. In the cavity 28 a heating element 30 is provided. In the depicted embodiment the heating element 30 is a blade heater that is arranged centrally and along the longitudinal axis of the cavity 28. The cavity 28 thus also forms the heating chamber of the aerosol-generating device 20.

The control circuitry 26 is configured for controlling the flow of electrical energy from the power source 24 to the heating element 30. In FIG. 1 the aerosol-generating article 10 is inserted into the cavity 28 of the aerosol-generating device 20. After use the aerosol-generating article 10 is removed from the cavity 28 and may be disposed.

Figure 2:
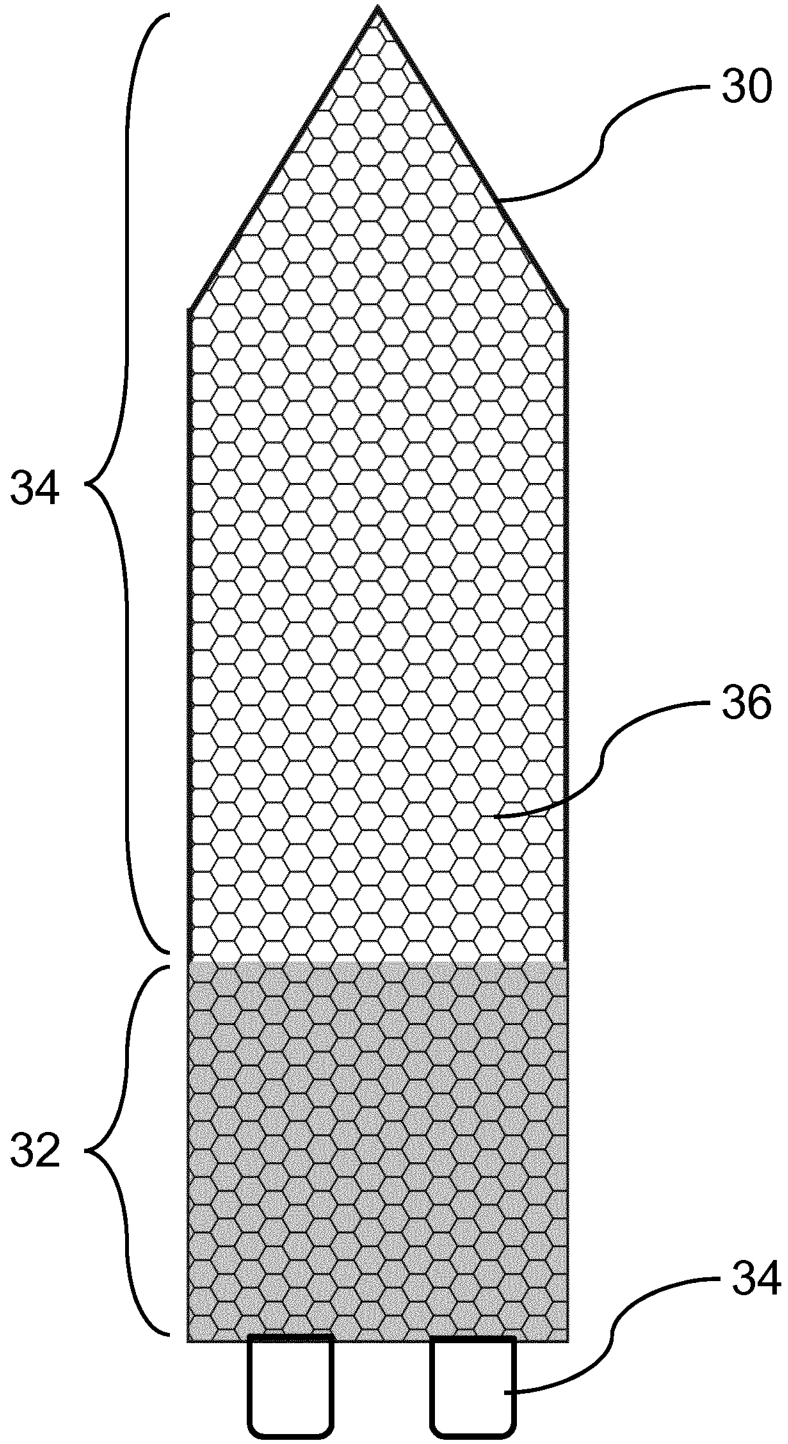
FIG. 2 shows a heating element according to the present invention.

In FIG. 2 an enlarged view of the heater element 30 as used in the aerosol-generating device 20 of FIG. 1 is depicted. The heater element 30 comprises a heat generating portion 32. The heat generating portion 32 comprises electrical contacts 34 that are connected via the control circuitry 26 to the power source 24. The heat generating portion 32 comprises a resistive heating element for generating the thermal energy required to volatilize aerosol-forming agent of the aerosol-forming substrate 12.

The heat generating portion 32 may extend substantially over the whole length of the heating element 30. Alternatively and as indicated by the shaded portion in FIG. 2, the heat-generating portion 32 may only be provided at one end of the heating element 30. Adjacent to the heat-generating portion 32 there is provided a non-heat-generating portion 34. The non-heat-generating portion 34 is formed from thermo-resistive glass, and is attached to the heat-generating portion 32. The heat generating portion 32 is covered by an electrically insulating material. In this case the insulating material is a layer of glass and is made from the same material as the non-heat-generating portion 34.

The heating element 30 further comprises a carbon-containing layer 36 provided on the electrically insulating material and across both the heat generating portion 32 and the non-heat-generating portion 34. In the embodiment of FIG. 2 the carbon-containing layer 36 is a layer of graphene and is schematically indicated by the hexagonal pattern provided to the heating element 30. The layer of graphene is electrically insulated from the heat-generating portion 32 by the glass layer. However, the layer of graphene is still in good thermal contact with the heat-generating portion 32.

In use the thermal energy generated in the heat-generating portion 32 of the heating element 30 is distributed fast and homogenously through the carbon-containing layer 36 across the whole surface of the heating element 30.

Figure 3:
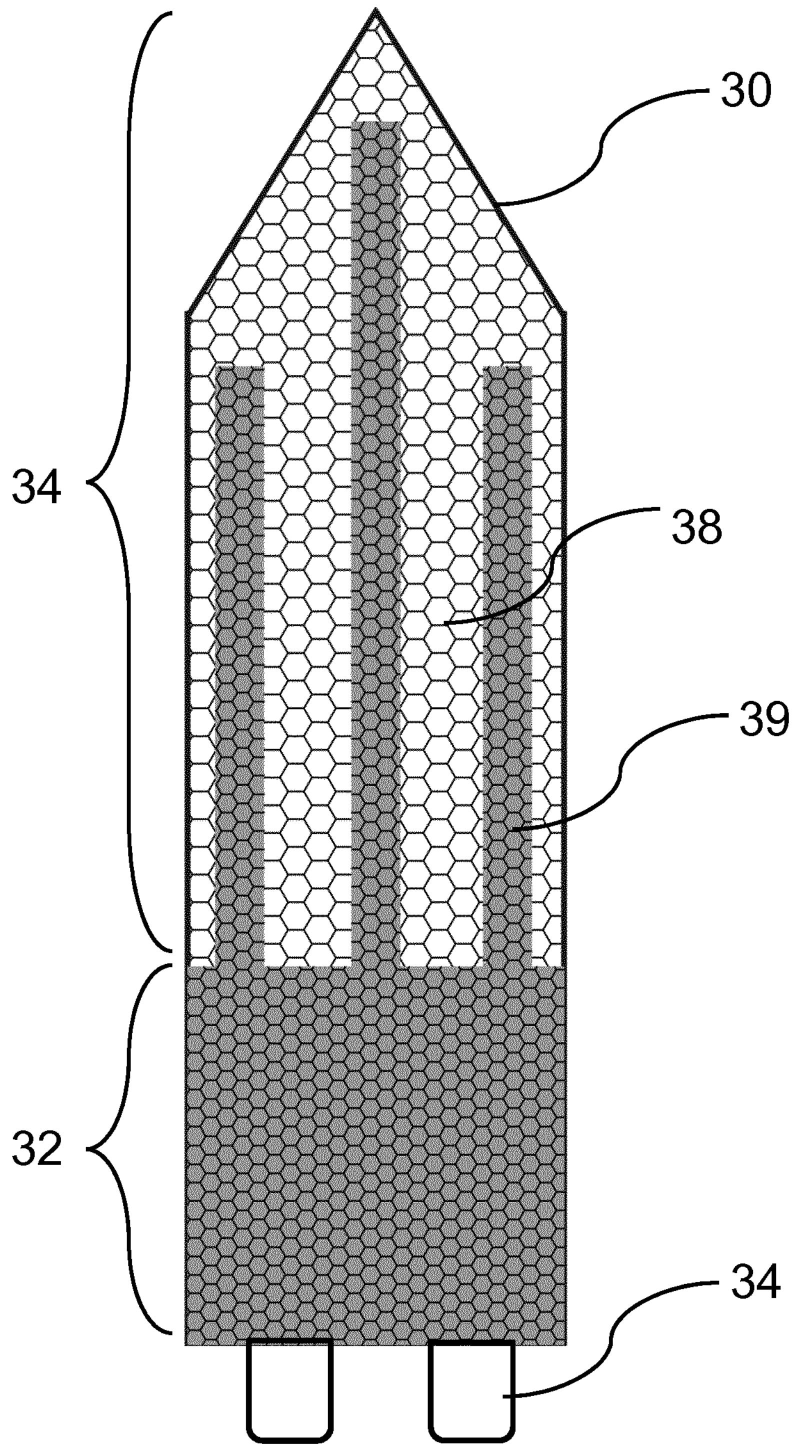
FIG. 3 shows a modified heating element according to the present invention.

FIG. 3 shows a modified design of the heating element 30 according to the invention. The heating element 30 is substantially identical to the heating element shown in FIG. 2. The modification lies in the carbon-containing layer 36 comprising a first layer of graphene 38 and a second layer of graphene 39. The second layer of graphene 39 is provided on top of the first layer of graphene 38. The first layer of graphene 38 essentially is identical to the carbon-containing layer 36 depicted in the embodiment of FIG. 2.

The design of the second layer of graphene 39 differs from the design of the first layer of graphene 38. The second layer of graphene 39 also covers the complete heat-generating portion 32 of the heating element 30. In this way good thermal contact of the graphene layers 38, 39 to the heat-generating portion 32 is obtained. However, in the area of the non-heat generating portion 34 of the heating element 30, the second layer of graphene 39 is shaped to form a plurality of stripes extending from the heat-generating portion 32 across the non-heat generating portion 34 towards the tip of the heating element 30. In this way the carbon-containing layer 36 defines preferred heat distribution channels on the surface of the heating element 30.

The invention claimed is:

1. A heating element for an aerosol-generating device, the heating element comprising:

a heat-generating portion and a carbon-containing layer in thermal contact with the heat-generating portion, wherein the carbon-containing layer comprises graphene; and a non-heat-generating portion, wherein a layer of graphene is configured to transfer generated heat from the heat-generating portion to the non-heat-generating portion of the heating element.

2. The heating element according to claim 1, wherein the heating element is an electrically heated heating element.

3. The heating element according to claim 1, wherein the heating element further comprises a layer of electrically insulating material arranged between the heat-generating portion and the carbon-containing layer.

4. The heating element according to claim 1, wherein the carbon-containing layer is in the form of a graphene coating, or comprises one or more graphene sheets.

5. The heating element according to claim 1, wherein the carbon-containing layer comprises at least two graphene sheets, and wherein additional carbon-containing structures are provided between the at least two graphene sheets.

6. An aerosol-generating device for generating an inhalable aerosol, the device comprising:

a heating chamber configured to receive an aerosol-generating article containing aerosol-forming substrate, wherein the aerosol-generating device comprises a heating element according to claim 1.

7. The aerosol-generating device according to claim 6, wherein the heating element is an internal heating element that is arranged within the heating chamber.

8. The aerosol-generating device according to claim 7, wherein the heating element is arranged centrally and aligned along a longitudinal axis of the heating chamber.

9. The aerosol-generating device according to claim 7, wherein the heating element comprises one or more heating blades or heating needles.

10. The aerosol-generating device according to claim 6, wherein the heating element is an external heating element that is arranged adjacent to a sidewall of the heating chamber, or wherein the heating element is an external heating element that at least in part forms part of a sidewall of the heating chamber.

11. The aerosol-generating device according to claim 10, wherein the carbon-containing layer extends at least partly over an inner sidewall of the heating chamber.

12. The aerosol-generating device according to claim 6, wherein the device further comprises a controller, a power supply, and contacts, wherein the contacts electrically contact the heat-generating portion of the heating element, and wherein the controller is configured to control a supply of power from the power supply to the heat-generating portion via the contacts.

13. A method of manufacturing a heating element for an aerosol-generating device, the method comprising the following steps:

i) providing a heat-generating portion;

ii) arranging a graphene-containing layer onto and in thermal contact with the heat-generating portion;

iii) providing a non-heat-generating portion of a heating element; and iv) arranging the graphene-containing layer so as to transfer generated heat from the heat-generating portion to the non-heat-generating portion of the heating element.

14. The method of manufacturing a heating element for an aerosol-generating device according to claim 13, wherein the graphene-containing layer is provided in the form of a graphene coating to the heat-generating portion of the heating element.

15. The method of manufacturing a heating element for an aerosol-generating device according to claim 13, the method further comprises arranging the graphene-containing layer onto and in thermal contact with the non-heat-generating portion of the heating element.

* * * * *